United States Patent [19]

McCord et al.

[11] 3,951,552

[45] Apr. 20, 1976

[54] PHOTOMETER-DIGITIZER SYSTEM

[75] Inventors: Thomas B. McCord, Manchester, Mass.; James A. Westphal, Altadena, Calif.

[73] Assignee: Massachusetts Institute of Technology, Cambridge, Mass.

[22] Filed: Aug. 7, 1972

[21] Appl. No.: 278,571

[52] U.S. Cl............................. 356/215; 250/211 J
[51] Int. Cl............................................. G01j 1/46
[58] Field of Search............... 556/215; 178/6.6 A; 250/211 J, 238, 352; 317/235 N; 313/65 AB

[56] References Cited
UNITED STATES PATENTS

| | | | |
|---|---|---|---|
| 3,011,089 | 11/1961 | Reynolds........................ | 250/211 J |
| 3,021,433 | 2/1962 | Morrison......................... | 250/211 J |
| 3,227,885 | 1/1966 | Hirai et al....................... | 250/238 |
| 3,403,284 | 9/1968 | Buck et al....................... | 250/211 J |
| 3,407,322 | 10/1968 | Saum.............................. | 250/352 |
| 3,617,626 | 11/1971 | Bluth et al...................... | 178/6.6 A |
| 3,634,692 | 1/1972 | Padovani........................ | 250/211 J |

Primary Examiner—Ronald L. Wibert
Assistant Examiner—Conrad Clark
Attorney, Agent, or Firm—Arthur A. Smith, Jr.; Robert Shaw; Charles L. Gagnebin, III

[57] ABSTRACT

A long exposure photometer-digitizer operative in an integration mode to receive weak illumination as from celestial observations through a telescope or from field or laboratory observations of objects and to provide a recorded digital representation thereof. A silicon, vidicon illumination sensor is employed to provide a wide dynamic range, sensitive and linear response over a large spectral region. Cumulative photon interaction with the vidicon tube during a long exposure is achieved by operating the vidicon at a reduced temperature which minimizes dark current effects and promotes integration mode operation. After a predetermined vidicon exposure interval the image electrically stored in the target is read out by a scanning electron beam, digitized and recorded to provide an immediately available digital record of the object. The target is sensitized before each exposure.

4 Claims, 4 Drawing Figures

PHOTOMETER-DIGITIZER SYSTEM

FIELD OF THE INVENTION

This invention relates to photometers and in particular to a vidicon, integrating mode photometer with digitally recorded output suited for long exposure observations of celestial or laboratory objects.

BACKGROUND OF THE INVENTION

In the field of recording weak illumination such as from astronomical phenomenon through telescopes the standard photographic plate of the past century has been replaced by electronic imaging techniques to overcome the problems of reciprocity and threshold sensitivities to faint celestial objects. While the photomultiplier tube is perhaps one of the most sensitive photoelectric light detectors its limitation to single point observation has required that scanning mechanisms be employed where a two-dimensional field of view is desired. The scanning has reduced the practicality of making long exposures. Other means for two-dimensional detection and recording of faint illumination include the use of two-dimensional sensor arrays. One particular example is the vidicon tube where a photoconductive target is exposed for an interval to low level radiation which registers a photoelectric pattern in the target representative of incident intensity. This registered pattern is converted to a sequence of electrical signals by scanning the target in adjacent scan lines. These prior art vidicon detector systems have exhibited many deficiencies which include a lack of sufficient dynamic range to detect the many magnitudes of variation in received celestial illumination, a lack of linearity in target response, a limited spectral response, and a low efficiency in the detector response.

Additionally, with the availability today of sophisticated image display and enhancement equipment and techniques it has become desirable to obtain records of low illumination level observations in a form suitable for storage, display and enhancement. Standard video recorders which have been used before to store an image are subject to amplitude and position error.

BRIEF SUMMARY OF THE INVENTION

In a preferred embodiment of the present invention a two-dimensional vidicon photometer having desirable response characteristics is caused to operate in an integrating mode for exposure to weak astronomical or laboratory radiation. The vidicon target stores a charge pattern in response to the radiation and the pattern is subsequently read from the target for digitizing and recording in a form which retains image accuracy and is suitable for further digital processing or display.

In the implementation of the present system, a silicon vidicon tube is selected for the properties of good linearity, dynamic range, quantum efficiency and spectral response. The silicon target of the vidicon tube is provided with an electric charge, back biasing a P-N junction between two semiconducting regions thereof. To induce an integrating mode of operation in the target and inhibit "dark current" the vidicon tube is placed in a dry ice environment to produce a greatly reduced target temperature.

Illumination is focussed onto the target surface and incident photons penetrate the silicon target to react with the molecular structure of the silicon and produce a charge carrier pair. A charge carrier released by each incident photon drifts to a nearby point of the P-N junction where a quantum change in stored charge and consequently junction voltage is produced. As a result of target temperature, the same quantum change is induced to occur with each received photon over the duration of long exposures to permit the target to accumulate a net charge change pattern linearly reflecting total incident radiation over a large dynamic range. The increased sensitivity of the long exposure is augmented by the high quantum efficiency and large spectral range of silicon as the target material.

After exposure completion, the vidicon target is scanned by an electron beam to produce an electrical signal sequence representative of the cumulative charge change pattern. The signal sequence is immediately digitized to retain amplitude and position accuracy and is then stored on tape for later data processing or plotting. The signal is also applied to a scan converter where received illumination can be monitored by a conventional television system.

BRIEF DESCRIPTION OF THE DRAWINGS

These and other features of the present invention will be more fully disclosed below in a detailed description of the preferred embodiment presented for purposes of illustration, and not by way of limitation, and in the accompanying drawings of which.

DETAILED DESCRIPTION OF A PREFERRED EMBODIMENT

Long exposure photographic imaging of celestial or laboratory objects has long been possible as a means to increase the sensitivity of the basic photographic plate by providing long exposure thereof. Threshold and reciprocity limitations of photographic films, however, severely restrict the sensitivity increase which proceeds with increasing exposure time. Similarly, the use of standard vidicon tubes to provide long exposures of celestial objects as a way of increasing sensitivity has been limited by lower than desired linearity, dynamic range, quantum efficiency and spectral range of previous integrating vidicons.

Figure 1:
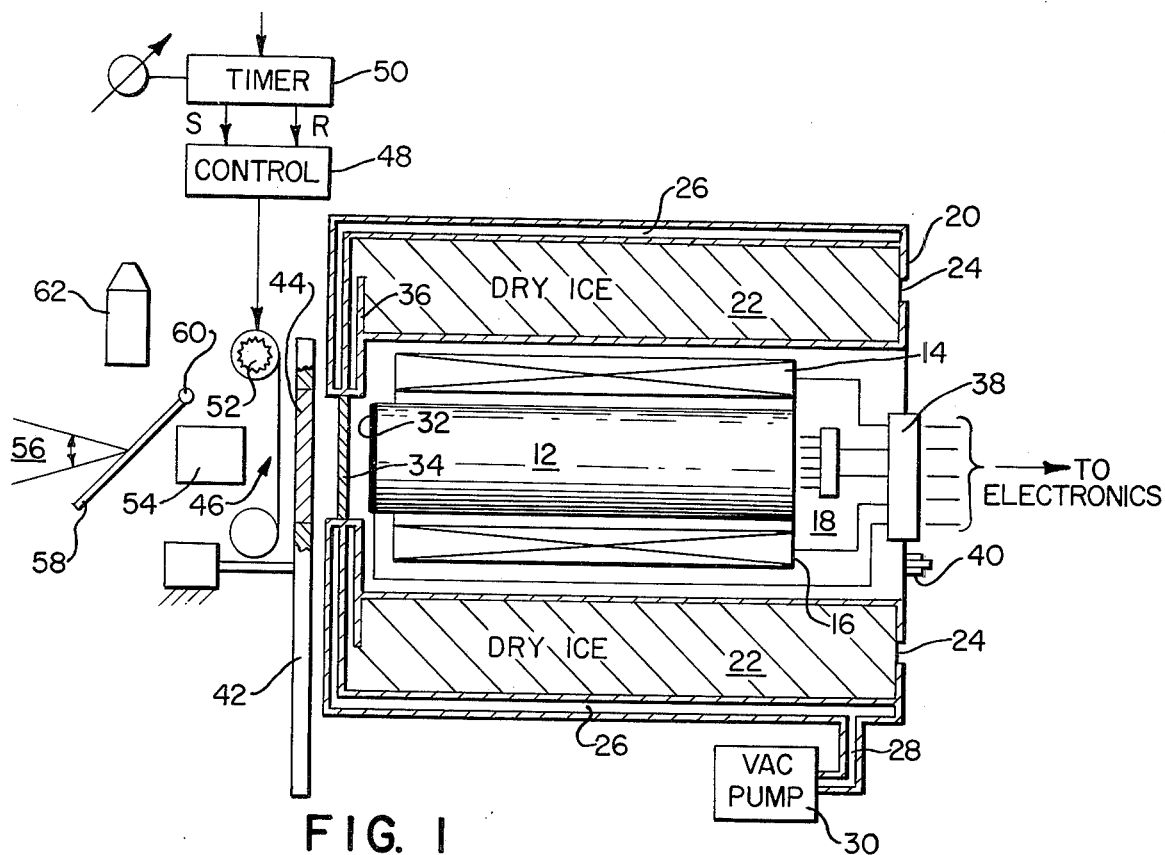
FIG. 1 is a diagrammatic view of a vidicon tube exposure and cooling system according to the invention.

Referring now to FIG. 1 there is shown a camera for two-dimensional detection of low level radiation on a silicon vidicon target having a linear response, wide dynamic range, high quantum efficiency and large spectral range. While it has previously not been possible to achieve these advantages of a silicon vidicon in an integrating mode exposure, there is here provided a cooling system which enables an integrating mode of operation. In particular, the vidicon tube 12 is placed in operative association with beam deflection coils 14 and 16 and together tube 12 and coils 14 and 16 are contained in the cavity 18 of an insulated cold box 20. Surrounding the tube 12 and coils 14 and 16 is an annular sheath 22 of the cold box 20 which in use is packed with dry ice through openings 24. Surrounding the annular sheath 22 is a sealed, insulating space 26 which communicates through a conduit 28 to a vacuum pump 30 to permit evacuation of the atmosphere from the space 26 to increase its insulating properties.

The vidicon tube 12 has a silicon target 32 positioned for viewing through a saphire viewing port 34 in the cold box 20. One or more thermally conductive fins 36 protrude into the space of the annular sheath 22 from its inner cylindrical surface in the vicinity of the target 32 to augment the cooling effect near the target and compensate for thermal conductivity through the saphire port 34.

Electrical connections to the target 32, vidicon tube 12, and deflection coils 14 and 16 are provided through an hermetic connector 38 in a rear wall of the cold box 20 to maintain an atmosphere seal for the cavity 18. A port 40 communicates to the cavity 18 from the environment to permit filling thereof with dry nitrogen gas at atmospheric pressure to inhibit condensation on the target 32 or saphire port 34 from cooling of the cavity 18.

While it has been found satisfactory for appropriate temperature control of the target 32 to provide an annular sheath 22 packed with dry ice, it is to be understood that other cooling techniques may be employed and in particular techniques which provide even lower target temperatures to further increase the benefits indicated herein. Similarly, while it has been found preferrable to use for the vidicon tube 12 the type 4532 Silicon Diode Array Camera Tube of the Radio Corporation of America, it is to be understood that other detection arrays having the properties indicated below may be employed.

Directly ahead of the saphire viewing port 34 is a rotatable filter wheel 42 having therein a plurality of filters 44 which may be employed or not to select predetermined spectral regions for viewing by the photometer system. Directly ahead of the filter wheel 42 is a mechanical shutter mechanism 46 which may typically be a standard curtain shutter. An exposure control actuator 48 receives set and reset inputs representing the beginning and terminal points of a predetermined exposure interval from a timer 50. The control actuator 48 operates to open the shutter 46 in response to a set input and to close the shutter in response to a reset input. These being simply accomplished with the shutter in the "B" operating mode whereby an actuation from the controller 48 opens the curtain and a release from the controller 48 closes the curtain. A knob 52 enables manual winding of the shutter 46 to enable each exposure.

A lens system 54 is positioned before the curtain of the shutter 46 to receive light from a field of view 56 of predetermined solid angle and focus an image of the object under study onto the surface of the silicon target 32 behind the saphire viewing port 34. The use of a lens system 54 permits adjustable focusing of the photometer for viewing of laboratory or field objects. When employed with astronomical telescopes, the lens 54 may be deleted where the telescope itself is operative to provide a focussed image at a focal plane coincident with the target 32.

To permit initial alignment of the camera viewing angle, a flat mirror 58 is supported from a pivot 60 to intercept light from the field of view 56 and direct it to an eyepiece 62. During exposure of the incident illumination onto the silicon target 32 the mirror 58 is swung about the pivot 60 out of the line of sight between the field of view 56 and the viewing port 34.

Figure 2:
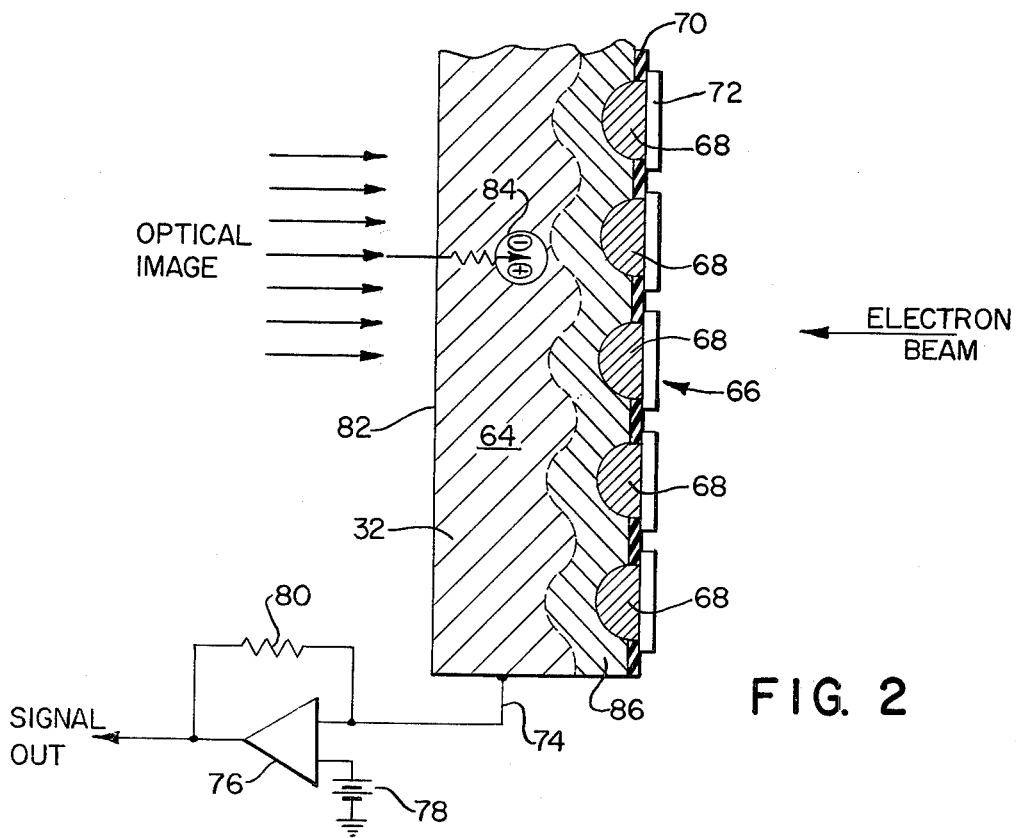
FIG. 2 is a cross-sectional view of the vidicon target.

To further describe the integrating mode operation achieved by the photometer system of the present invention reference will be made to FIG. 2 showing a sectional view of the silicon target 32 of the vidicon tube 12. The target 32 comprises a body 64 of crystallized silicon which has been doped to provide N type semiconductor characteristics. On a surface 66 a two-dimensional array of P-type semiconducting regions 68 have been created by diffusion through etched openings in a silicon dioxide insulation layer 70. On top of each P-type region 68 there is a conducting epitaxially grown silicon "top hat" 72 which intercepts the electron beam generated within the vidicon tube 12.

An electrical connection is made to the N-type body 64 of the wafer 32 by a conductor 74 which leads to an input of a differential amplifier 76. A ten volt reference signal is applied from a source 78 to a differential input of the amplifier 76, and a feedback resistor 80 provides gain determination for the amplifier 76.

Light from an object under observation is focused onto the left hand outward viewing surface 82 of the silicon wafer 32. According to one theoretical model, photons in the incident illumination penetrate the wafer 32 through the surface 82 with a high probability of producing a hole-electron charge carrier pair 84 at some point in the passage of the photon through the target. The spectral characteristics of silicon in reacting to photons to produce charge carrier pairs is particularly advantageous and in the case of the above-indicated tube type ranges from approximately 6 percent in the infrared region to approximately 85 percent within the visible range near the ultraviolet spectral region.

While normal vidicon operation is satisfactory for employing the vidicon tube in typical television applications, for use in detecting faint light sources as in the astronomical field it is desirable to permit long term exposure of the wafer 32 between each scan by the electron beam to provide an accumulated response in the wafer 32. Such attempted operation, however, results in unsatisfactory results due to an apparent inability of the vidicon tube 12 to operate in an integrating or cumulative response mode and due to the phenomenon of "dark current" whereby randomly generated hole-electron pairs operate to disturb the stored image in the target 32. With the present system the target 32 is greatly reduced in temperature and caused to operate in an integrating mode and the effective dark current reduced to satisfactory levels.

To achieve target charging a vidicon electron beam is emitted from ground potential and directed toward the surface 66 for several cycles of complete scan at a relatively low current, defocused beam. In conjunction with the 10 volt reference source 78 this produces an evenly distributed 10 volt back-bias charge across the semiconductor junctions between the regions 68 and the region 64. The low leakage conductance of those junctions enables capacitor-like storage of that charge for relatively long periods of time such as several hours. With this charge stored in the wafer 32 a depletion region 86 is established in the region 64 bordering the junction with the P-type regions 68. With each hole-electron pair created by an incident photon, the diffusion of the hole across the semiconductor junction of the nearest P-type region 68 reduces the junction charge by one electron. The reaction is linear over a very wide dynamic range of at least three orders of magnitude since each photon which reacts to produce a hole-electron pair produces a predetermined discharge of the signal across the nearest P-N junction.

The number of photons which react to produce charge pairs in the wafer 32 is a function of the quantum efficiency of silicon to the spectral characteristics of that incident radiation and is statistically constant for a constant incident light intensity and color. Moreover, the elimination of substantially all dark current effects insures that the reduction in charge stored across each semiconductor junction will be a function only of incident light energy at that point. It is accordingly possible to expose the surface 82 of the wafer 32 for long periods of astronomical or laboratory observation while each semiconductor junction in the wafer 32 accumulates a net charge adjustment reflecting the integral of the incident radiation over the elapsed observation time. While, for astronomical purposes, the duration of night time provides a practical limitation to the extent of useful exposure, the system may be employed for exposures longer than the available hours of darkness.

Once the long exposure is completed, and the cumulative charge change across each semiconductor junction is achieved, this latent image is "read-out" by a single parallel line scan by the electron beam across the entire surface 66 to apply a sequence of electrical signals to amplifier 76 representing that latent image. Because the image may be stored indefinitely in the vidicon target, the scan may be at a slow rate satisfactory for digitizing and electronic recording of the image.

Figure 3:
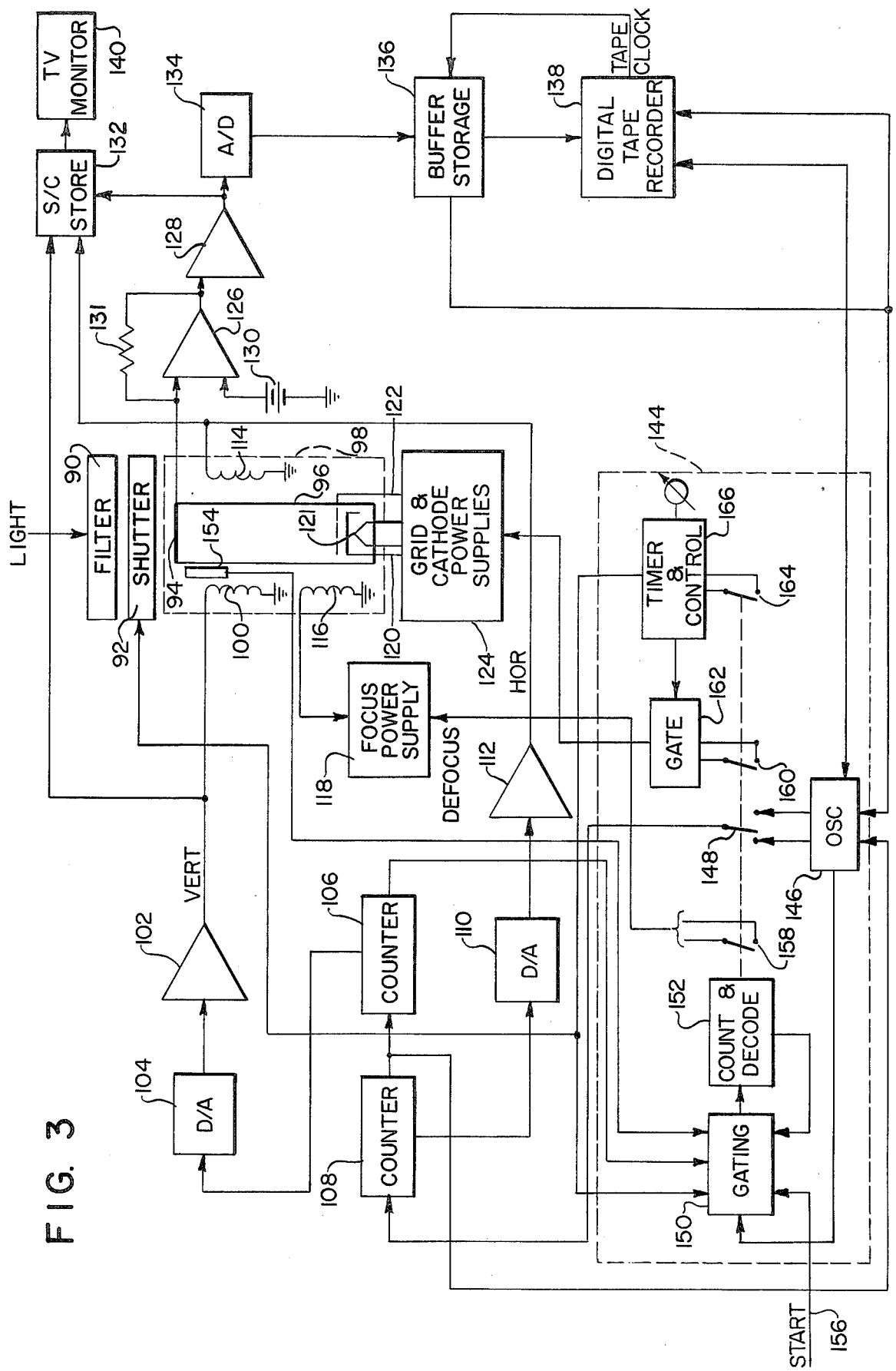
FIG. 3 is a block and schematic diagram of the photometer vidicon control system according to the invention.

With reference now to FIG. 3 a complete system is indicated for digitally recording long exposure, integrating mode images utilizing the vidicon camera of FIG. 1. Light is incident through a filter 90 and shutter 92 to a target 94 of a vidicon tube 96 within a cold box 98. A vertical deflection coil 100 for the tube 96 receives scan signals through a buffer amplifier 102 and digital-to-analog converter 104 from a counter 106 which is incremented by the overflow output of a counter 108. The digital states of the counter 108 are applied through a digital-to-analog converter 110 and buffer amplifier 112 to horizontal deflection coils 114 for the vidicon tube 96. A focus coil 116 for the tube 96 is operated from a focus power supply 118 as is known. A cathode 120, filament 121 and grid 122 for the vidicon 96 are operated from grid and cathode power supplies 124 also as is known in the art.

The signal received from the body of the target 94 is applied to an input of an amplifier 126 and its output is further applied to an amplifier 128. The amplifier 126 has a 10 volt reference 130 applied to a differential input thereof and a gain determining feedback resistor 131 therearound. The output of amplifier 128 is applied to the signal input of a scan converter 132 of conventional design and to an analog-to-digital converter 134 for application to a digital buffer storage 136 adapted to register a line of scan data. The scan converter 132 also receives the vertical and horizontal scan signals from the respective buffer amplifiers 102 and 112 to control its storage tube operation, and the stored television image of the scan converter 132 is applied to a television monitor 140 to provide monitoring of the detected radiation at the end of each exposure. The output of the buffer storage 136 is applied to a digital tape recorder 138, the tape clock signal thereof being used by the storage 136 to transfer data to the recorder 138. The data stored digitally in the recorder 138 may be subsequently computer processed to provide image enhancement as is practiced on television signals received from planetary exploration spacecraft.

Sequencing and control of the operation of the system of FIG. 3 is accomplished with a control unit 144 having therein a crystal oscillator 146 which provides high and low frequency timing signals to a switch 148 and a low frequency timing signal to a gating system 150. The gating system 150 provides timing signals to a state counter 152 under the control of a plurality of gating signals which include the overflow output of counter 106, a temperature control signal from a thermal monitor 154, state signals from the state counter 152 and a start signal 156. The state counter 152 controls the switch 148 to provide the high or low frequency timing signals to the input of counter 108 and in addition controls a switch 158 which causes the focus power supply 118 to defocus the tube 96 electron beam. A switch 160 which cooperates with a gate 162 to deactivate the grid and cathode power supplies 124 and a switch 164 which initiates the predetermined time interval of timer and control system 166 for opening and closing the shutter 92 are also activated by system 152. The gate 162 responds to a signal from the timer and control system 166 indicating an exposure exceeding a predetermined limit to deactivate the grid and cathode power supplies to eliminate any leakage of filament light and to reduce the power load on the cooling system during long exposures.

Figure 4:
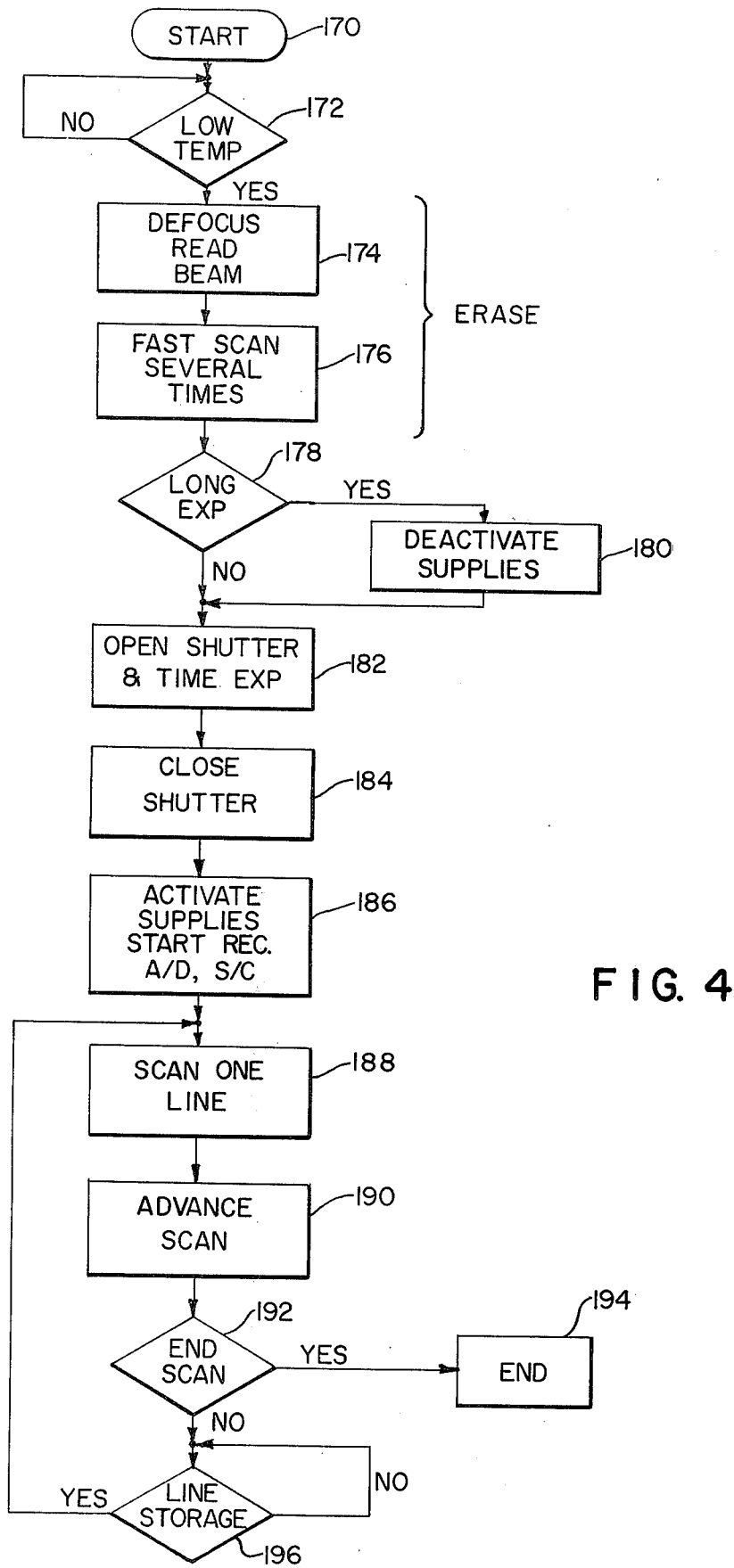
FIG. 4 is a flow chart illustrating photometer system operation over an exposure cycle.

With reference now to FIG. 4 a flow chart is indicated illustrating the sequence of operations of the controller 144 and particularly the gating system 150 and state counter 152 to provide a complete exposure cycle. While illustrated as automatic, the operations may be manual. From a start condition 170 a decision 172 is made by the gating system 150 to determine if the temperature monitor 154 indicates that the target temperature has been sufficiently reduced for proper operation. When that temperature has been reached an operation 174 is entered by stepping of the state counter system 152 to a condition which closes the switch 158 to defocus the power supply 118 to provide a broader beam scan across the array of P-type regions 68 in the target 32. Normally the beam size is focused to span several regions 68 simultaneously to minimize intensity variations due to beam alignment. The defocused beam for the initial erasure of the target provides an additional averaging effect to the beam. With the beam defocused an operation 176 is entered to provide for several rapid scans of the target by closure of switch 148 to the high frequency output of the oscillator 146 which in turn drives the counters 108 and 106. Several cycles later the gating system 150 stops the state counter 152. Subsequently a decision 178 is made by the gate 162 to determine if the exposure exceeds the predetermined limit in which case the power supplies 124 are deactivated in operation 180. In either event a subsequent operation 182 is entered to open the shutter 90 through activation of switch 164 by the counter and decoder system 162 until the predetermined exposure time has elapsed. At that point an operation 184 closes the shutter 92 through the timer and control system 166 and a subsequent operation 186 reactivates the power supplies 124, resets the focus supply 118 and activates the recorder 138, analog-to-digital converter 134 and scan converter 132. In accomplishing this the gating system 150 responds to the indication of the end of the exposure from the timer and control system 166 to advance the state counter 152 to a state which opens switches 158, 160 and 164 and connects switch 148 to the low frequency oscillation for application to counter 108. At this point the buffer storage system 136 will indicate the capacity to receive and store a scan line and provide an enable signal to the oscillator 146 and to the recorder 138. Accordingly operation 188 is entered which causes the scanning of a single line at slow speed to read out the latent image on the target 94. At the end of the scan line the overflow output from the counter 108 stops the oscillator 146 and advances the counter 106 to index the scan line vertically one elemental step in operation 190. A subsequent decision 192 is made by gating system 150 to determine if the entire array of target 94 has been scanned by detecting the overflow output of counter 106 and if affirmative operation branches to an end status 194, but if negative continues to a decision 196 for testing the capacity of storage 136. When a line of storage is available, as indicated by the application of an enable signal of the oscillator 146 sequencing returns to step 188 to provide for the scanning of a further line.

It can now be appreciated that according to the above described system, low level radiation over large spectral and dynamic ranges from celestial or laboratory objects can be detected to provide a linearly representative signal which is directly digitized to preserve amplitude and position accuracy and which is recorded for immediate availability for display or enhancement. While a preferred embodiment for the present invention has been described above in detail, it will occur to those skilled in the art that modifications and alterations can be made to the disclosed system without departing from the spirit of the invention. Accordingly it is intended to limit the scope of the invention only as indicated in the following claims.

What is claimed is:

1. A method for providing long-term single photometer exposure to relatively weak radiation comprising the steps of:

cooling the target of a vidicon tube to a lowered temperature which reduces dark currents in the target;

establishing a predetermined charge across the P-N junction of the target of said vidicon type tube with the cooling of said target preventing discharge of said P-N junction;

inhibiting electron beam scanning of the target of said vidicon type tube for a predetermined interval;

exposing said target to said relatively weak radiation for a period within said predetermined interval, said period being substantially longer than the scan period for the vidicon type tube;

the exposure of said target to said relatively weak radiation producing a cumulative discharge pattern on said target linearly representative of radiation incident on said target over a wide dynamic range, the reduction of dark currents by the cooling of said target preventing substantial distortion of the discharge pattern during said period;

producing electron beam scanning of said target subsequent to said predetermined interval to produce an output signal representative of the discharge pattern.

2. The method of claim 1 further including the step of:

providing a digital recording of said output signal representative of the discharge pattern.

3. Apparatus for providing integrating mode, relatively long-term, single exposure of the target of a vidicon type tube to relatively weak radiation comprising:

a vidicon type tube having a target which includes a plurality of P-N junctions;

means for producing electron beam scanning of the target of said vidicon type tube to produce a predetermined charge across the P-N junctions of said target;

means for cooling the target of said vidicon type tube so as to maintain said charge pattern for relatively long exposures of the weak radiation;

means for inhibiting scanning by said electron beam of said target for a predetermined interval;

means for exposing the target of said vidicon type tube to said relatively weak radiation for a period within said predetermined interval;

the exposure of said target to said relatively weak radiation producing integrating mode, cumulative discharge of the P-N junctions of said target in a pattern representative of said weak radiation; and means for causing scanning by said electron beam of said target subsequent to said predetermined interval to provide an output signal representing the discharge pattern on said target.

4. The apparatus of claim 3 further including:

means for providing a digital record of said output signal representing said discharge pattern.

* * * * *